United States Patent
Tashiro (10) Patent No.: US 7,599,006 B2
(45) Date of Patent: Oct. 6, 2009

(54) OVER-SAMPLING A/D CONVERTING CIRCUIT

(75) Inventor: Yasunori Tashiro, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 730 days.

(21) Appl. No.: 11/293,209

(22) Filed: Dec. 5, 2005

(65) Prior Publication Data
US 2006/0146192 A1    Jul. 6, 2006

(30) Foreign Application Priority Data
Jan. 4, 2005    (JP)    ............... 2005-000041

(51) Int. Cl.
H04N 9/64    (2006.01)
H03M 1/12    (2006.01)

(52) U.S. Cl. .............. 348/572; 348/537; 348/539; 348/571

(58) Field of Classification Search ........... 348/572, 348/571, 573, 537, 536, 539; 341/155
See application file for complete search history.

(56) References Cited

U.S. PATENT DOCUMENTS

| 4,745,492 A | 5/1988 | Kobayashi et al. |
| 5,157,395 A * | 10/1992 | Del Signore et al. ........ 341/143 |
| 5,459,520 A | 10/1995 | Sasaki |
| 6,369,857 B1 | 4/2002 | Balaban et al. |
| 2003/0063219 A1 | 4/2003 | Bellers |

FOREIGN PATENT DOCUMENTS

| JP | 62-287716 | 12/1987 |
| KR | 1999-001804 | 1/1999 |
| KR | 10-2004-0037199 | 5/2004 |

* cited by examiner

Primary Examiner—David L Ometz
Assistant Examiner—Jean W Désir
(74) Attorney, Agent, or Firm—Foley & Lardner LLP (57) ABSTRACT

To provide an A/D converting circuit capable of improving an S/N ratio regardless of a color television system. An over-sampling A/D converting circuit according to an embodiment of the present invention includes: an A/D converter for over-sampling an analog video signal; a digital low-pass filter allowing passage of a signal component in a predetermined passing band out of the over-sampled signal; a down-sampling circuit for down-sampling the passed signal; and a color television system determining circuit for switching the passing band.

14 Claims, 6 Drawing Sheets

RELATED ART

Fig. 4

RELATED ART

Fig. 5

RELATED ART

OVER-SAMPLING A/D CONVERTING CIRCUIT

BACKGROUND OF THE INVENTION

1. Field of the Invention

The present invention relates to an over-sampling A/D converting circuit, in particular, an over-sampling A/D converting circuit for processing analog video signals.

2. Description of Related Art

In recent years, television receivers or monitoring devices have advanced toward upsizing of their screens for displaying a picture. In such television receivers, a problem about a displayed image such as weak video noise comes to the surface albeit being ignorable on a small screen. To that end, a higher image quality is required.

Figure 4:
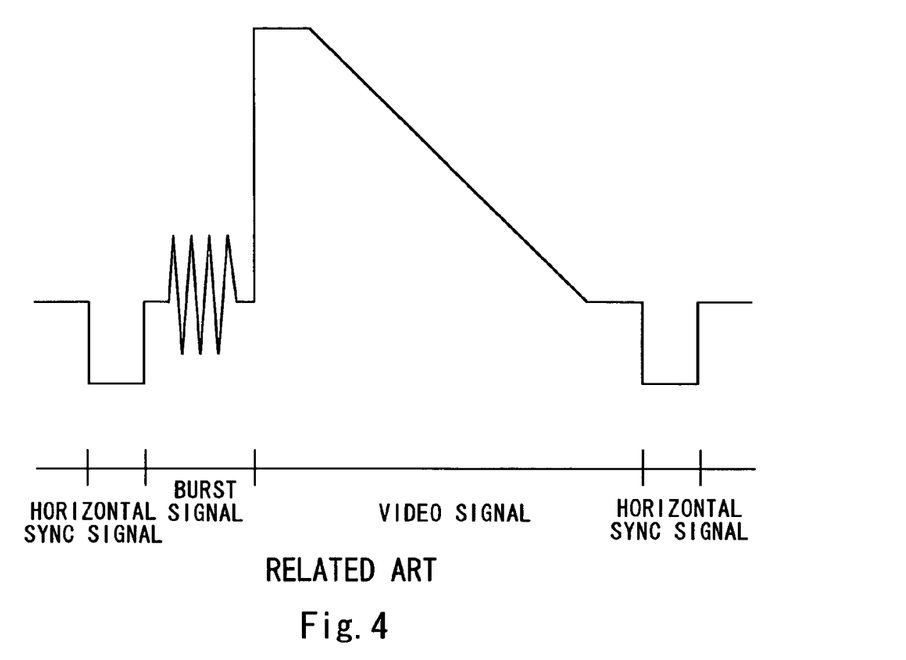
FIG. 4 is a waveform chart illustrative of a waveform of a video signal.
Figure 5:
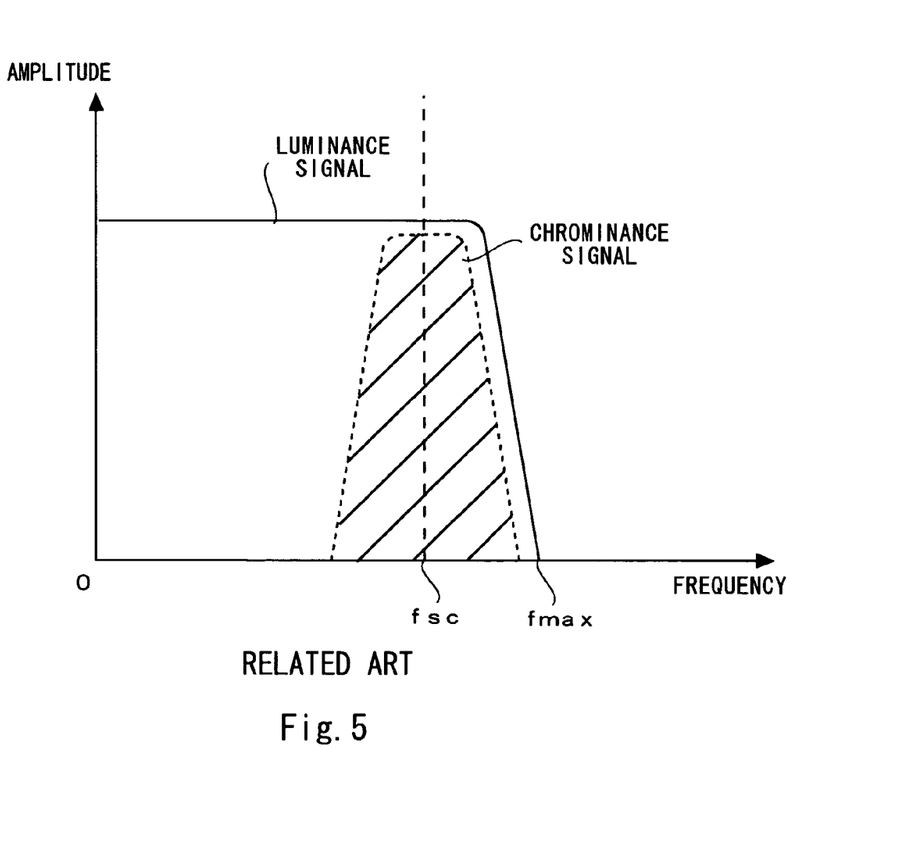
FIG. 5 is a graph illustrative of frequency characteristics of a video signal.

In general, a composite video signal as shown in FIG. 4 is input to the television receiver. As shown in FIG. 4, the composite video signal includes a video signal obtained by multiplexing a luminance signal (Y signal) with a chrominance signal (C signal), a burst signal used as a reference for the chrominance signal, and a sync signal for synchronizing signals. Further, the composite video signal has frequency characteristics as shown in FIG. 5. The frequency thereof falls within a frequency band from 0 to fmax (maximum frequency). The luminance signal is also within this frequency band. The chrominance signal is superimposed on a color subcarrier having a frequency fsc (color subcarrier frequency) to obtain a signal of a frequency within a predetermined frequency band where the frequency fsc is set at the center. This frequency fsc is a frequency of the burst signal of FIG. 4. A color television system (color television format) varies from one composite video signal to another. Depending on the color television system, the values of the frequencies fmax or fsc vary. As regards an NTSC color television system, for example, fmax=4.2 MHz and fsc=3.58 MHz. For a PAL color television system, fmax=6 MHz and fsc=4.43 MHz. In the video signals, there is a component video signal where the luminance signal is separated from the chrominance signal or color difference signal.

In digital video signal processing for processing a video signal, there are two kinds of system clock: a burst lock clock the phase of which is locked in the phase of the frequency fsc of the video signal; and a horizontal synchronizing lock clock the phase of which is locked in the phase of the horizontal synchronizing signal. A burst lock clock processing for the composite video signal enables high-accuracy separation between the Y signal and the C signal (Y/C separation), and a horizontal synchronizing lock clock processing for the composite video signal does not require a complicated circuit configuration. A general clock frequency is 4 fsc which is 4 times higher than the frequency fsc. In the component signal having no color subcarrier, 13.5 MHz that is a frequency of the horizontal synchronizing lock signal, is generally used.

Receiving the composite video signal, the television receiver separates the video signal into a luminance signal and a chrominance signal (Y/C separation) to demodulate the chrominance signal (C demodulation) and then displays a picture. In recent years, digital circuits are used for the above process to execute the Y/C separation or C demodulation through the digital signal processing. Therefore, an A/D converter for converting an analog video signal into a digital signal is generally provided upstream from a Y/C separation circuit. This A/D converter carries out the A/D conversion using 4 fsc as a sampling frequency.

Figure 6:
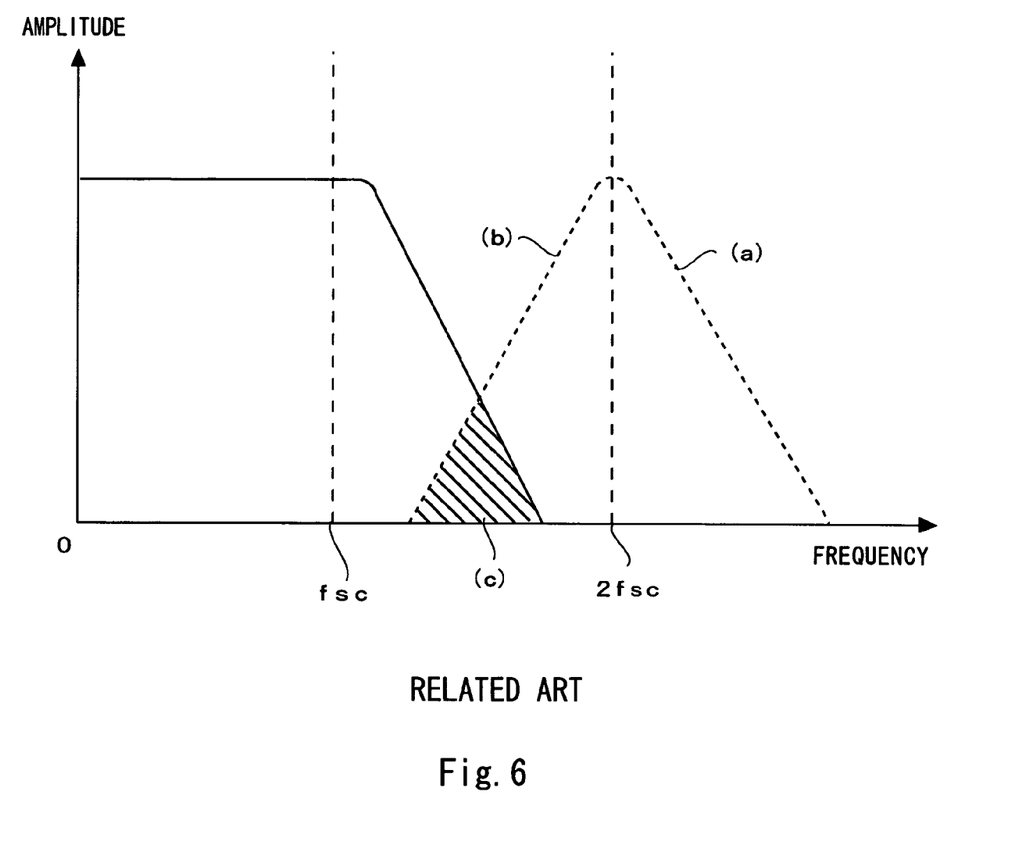
FIG. 6 is a graph illustrative of an aliasing noise of the video signal.

However, a weak video noise may annoy a viewer on a large screen of a monitor device due to the A/D conversion. This results from aliasing noise that would occur during the A/D conversion. The aliasing noise is described hereinbelow. In the A/D conversion, as long as the sampling frequency is at least twice the input signal frequency, the signal can be completely restored to the original signal. That is, the above frequency band is such a band as ensures information carried on the signal of ½ or less of the sampling frequency (Nyquist frequency). For example, if the sampling frequency is 4 fsc, as shown in FIG. 6, 2 fsc that is ½ of 4 fsc is the Nyquist frequency. Upon the A/D conversion with 4 fsc of sampling frequency, if there is a frequency component higher than 2 fsc of Nyquist frequency ((a) in FIG. 6), a signal component appears at a position ((b) of FIG. 6) symmetric about the Nyquist frequency to the position (a) (fold-back). Then, apart ((c) of FIG. 6) of the folded signal component frequency is superimposed on the original signal into the aliasing noise. As a conventional circuit for reducing the aliasing noise, for example, Japanese Unexamined Patent Publication No. 62-287716 discloses an over-sampling A/D converting circuit using a frequency band limiting filter.

Figure 7:
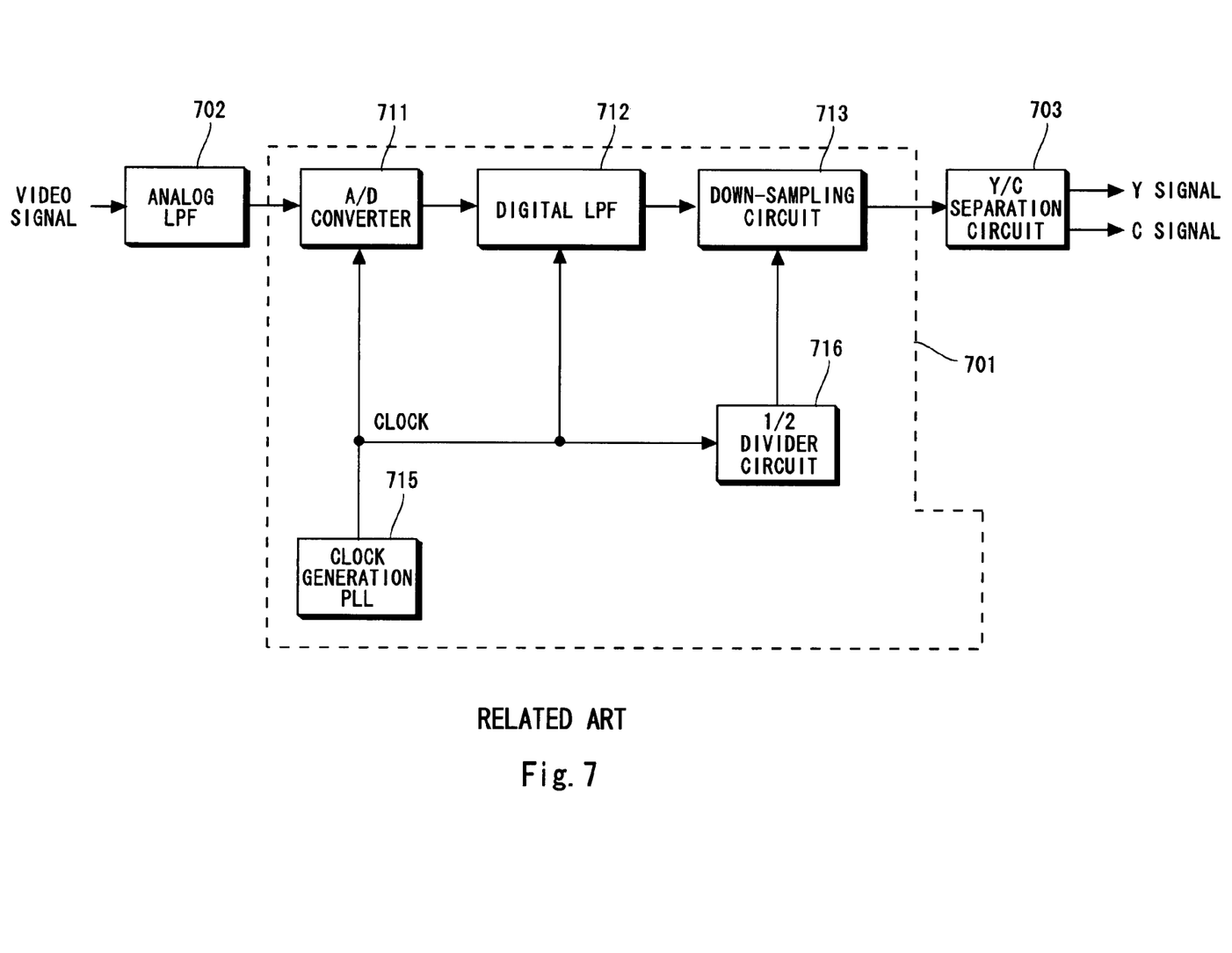
FIG. 7 is a block diagram showing the configuration of a conventional video signal processing apparatus.

FIG. 7 shows the configuration of a conventional video signal processing circuit byway of example. In this conventional video signal processing circuit, the conventional over-sampling A/D converting circuit is provided upstream from the Y/C separation circuit for the purpose of reducing the aliasing noise.

The conventional video signal processing circuit includes an analog low pass filter (LPF) 702 composed of an analog circuit, an over-sampling A/D converting circuit 701 and a Y/C separation circuit 703 composed of a digital circuit. Further, the conventional over-sampling A/D converting circuit 701 includes an A/D converter 711, a digital LPF 712, a down-sampling circuit 713, a clock generation phase locked loop (PLL) 715, and a ½ divider circuit 716.

In the conventional over-sampling A/D converting circuit 701, the A/D converter 711 executes the A/D conversion on a video signal input through the analog LPF 702 using the sampling frequency of 8 fsc. The digital LPF 712 limits the band using 2 fsc that is the Nyquist frequency of 4 fsc as a cut-off frequency. The down-sampling circuit 713 down-samples (thins out) the input signal frequency into the sampling frequency of 4 fsc to be output to the Y/C separation circuit 703. The Y/C separation circuit 703 separates the video signal with the sampling frequency of 4 fsc into a Y signal and a C signal.

The clock generation PLL 715 generates a clock at which the A/D converter 711, the digital LPF 712, and the down-sampling circuit 713 operate. The clock generation PLL 715 oscillates 8 fsc as a sampling clock frequency of the A/D converter 711. The ½ divider circuit 716 divides the frequency 8 fsc oscillated by the clock generation PLL 715 into ½ to generate a clock of 4 fsc as the sampling frequency of the down-sampling circuit 713.

The digital LPF 712 is so designed as to operate with the cut-off frequency of 2 fsc based on the clock of 8 fsc generated with the clock generation PLL 715. Then, the digital LPF 712 eliminates the signal component not lower than the Nyquist frequency to reduce the aliasing noise.

However, the conventional over-sampling A/D converting circuit 701 of FIG. 7 has a problem in that the noise cannot be eliminated depending on the color television system, leading to a low S/N ratio (signal-to-noise ratio). Accordingly, in the case where the output signal from the conventional over-sampling A/D converting circuit 701 is subjected to Y/C separation to display a picture, interference due to a noise occurs to deteriorate an image quality.

In other words, since the frequency fsc (color subcarrier frequency) varies from one color television system to another as mentioned above, the frequency of 8 fsc oscillated from the clock generation PLL 715 varies depending on the color television system. The digital LPF 712 is so designed as to have predetermined filter characteristics based on the input clock. Hence, if the frequency fsc varies, the filter characteristics of the digital LPF 712 accordingly change. As a result, the filter characteristics vary depending on the color television system. The cut-off frequency is different from a desired Nyquist frequency, making it impossible to accurately eliminate the aliasing noise.

SUMMARY OF THE INVENTION

An aspect of the present invention relates to an over-sampling A/D converting circuit includes: an input receiving an analog video signal; and a filter unit limiting a frequency band of the analog video signal in accordance with a sampling frequency that varies depending on a color television system of the analog video signal. According to the circuit, it is possible to accurately eliminate a signal component not lower than the Nyquist frequency in accordance with a color television system, enabling a reduction in aliasing noise, a higher S/N ratio, and a high image quality obtained at a subsequent stage.

According to another aspect of the invention, an over-sampling A/D converting circuit includes: a first sampling unit executing A/D conversion on an input analog video signal with a first sampling frequency; a frequency band limiting filter unit allowing passage of a signal component in a predetermined passing band out of a signal passing through the first sampling unit; a second sampling unit sampling the passed signal with a second sampling frequency; and a switching unit switching the passing band of the frequency band limiting filter unit. According to the circuit, it is possible to accurately eliminate a signal component not lower than the Nyquist frequency in accordance with a color television system, enabling a reduction in aliasing noise, a higher S/N ratio, and a high image quality obtained at a subsequent stage.

According to the present invention, it is possible to provide an over-sampling A/D converting circuit capable of improving an S/N ratio regardless of the color television system.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
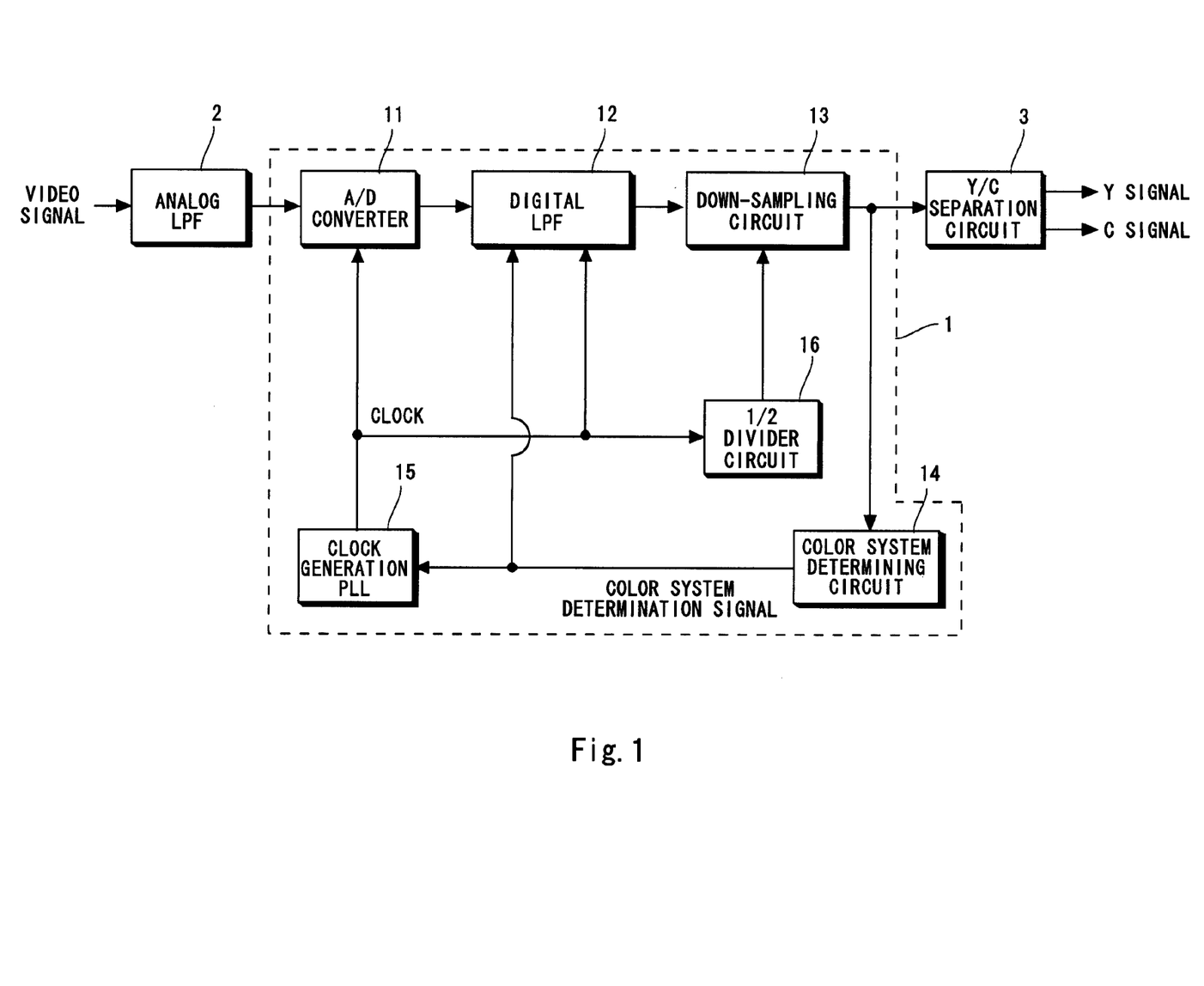
FIG. 1 is a block diagram showing the configuration of a video signal processing apparatus according to an embodiment of the present invention.
Figure 2:
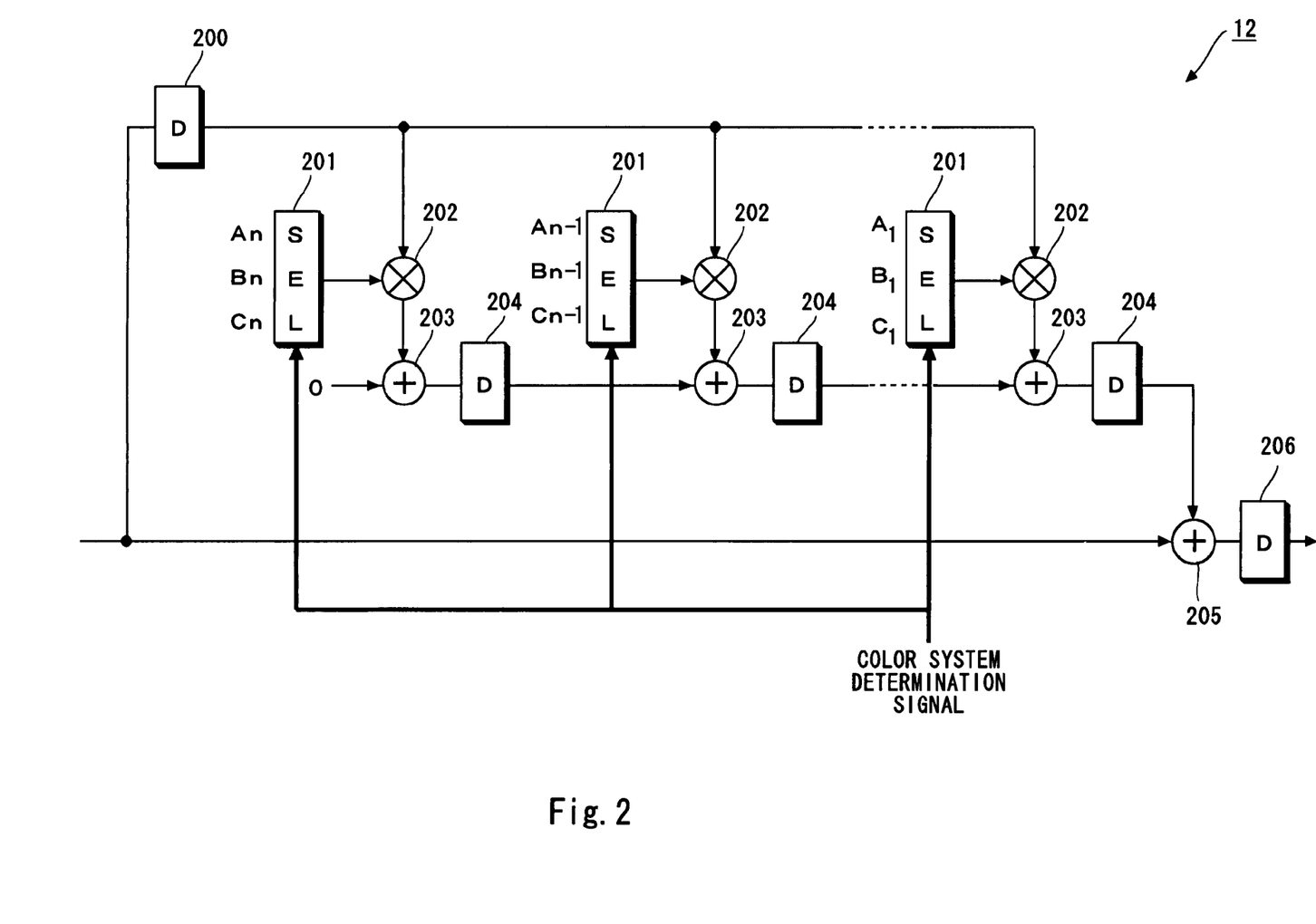
FIG. 2 is a circuit diagram showing the configuration of a digital LPF according to the embodiment of the present invention.

Referring now to FIGS. 1 and 2, a video signal processing circuit and an A/D converting circuit according to a first embodiment of the present invention are described. A feature of this embodiment is that a filter factor of the LPF in the A/D converting circuit is changed depending on the color television system to obtain optimum filter characteristics.

FIG. 1 shows the configuration of the video signal processing circuit according to this embodiment. This video signal processing circuit is provided to, for example, a television receiver and adapted to convert radio wave received through an antenna into an RF signal and receive a video signal obtained by detecting a picture carrier.

The video signal processing circuit receives a composite video signal (analog video signal) prepared by superimposing the Y signal and the C signal as shown in FIGS. 4 and 5 to convert the analog signal into a digital signal and separate the Y signal from the C signal. The signal is further subjected to the C demodulation downstream from the video signal processing circuit to display a picture. The signal input to the video signal processing circuit is not limited to a video signal (composite video signal) prepared by superimposing the Y signal and the C signal, and such a component signal that the Y signal and the C signal are separately transmitted may be input. That is, only the C signal of the component signal may be input.

As shown in FIG. 1, the video signal processing circuit includes an analog LPF 2 composed of, for example, an analog circuit, and an over-sampling A/D converting circuit 1 and a Y/C separation circuit 3 composed of, for example, a digital circuit. Further, the over-sampling A/D converting circuit 1 includes, as shown in FIG. 1, an A/D converter 11, a digital LPF 12, down-sampling circuit 13, a color television system determining circuit 14, a clock generation PLL 15, and a ½ divider circuit 16.

The analog LPF 2 eliminates a signal component of the input analog video signal with a frequency not lower than a predetermined cut-off frequency, and mainly allows the analog signal not higher than the cut-off frequency to pass therethrough. The cut-off frequency of the analog LPF 2 is preferably the Nyquist, frequency of the A/D converter 11 in the subsequent A/D converting circuit 1, that is, ½ of the sampling frequency, for example, 4 fsc. This cut-off frequency is set as the Nyquist frequency of the A/D converter 11, so the generation of the aliasing noise in the A/D converter 11 can be efficiently suppressed.

The over-sampling A/D converting circuit 1 samples the analog video signal passed through the analog LPF 2 with a predetermined frequency into a digital signal to output the converted signal to the Y/C separation circuit 3. The sampling frequency of the digital signal output from the over-sampling A/D converting circuit 1 is, for example, 4 fsc. The over-sampling A/D converting circuit 1 of this embodiment changes the filter characteristics of the digital LPF 12 depending on the color television system of the input video signal. That is, a band of a sampling frequency of the down-sampling circuit 13 is changed depending on the color television system.

The Y/C separation circuit 3 executes the Y/C separation on the digital video signal output from the over-sampling A/D converting circuit 1 to output the Y signal and the C signal. The Y/C separation circuit 3 can separate the Y signal from the C signal using a comb filter, for example.

Each block of the over-sampling A/D converting circuit 1 is described in more detail. The A/D converter 11 (first sampling unit) over-samples, that is, samples (A/D converts) the analog video signal passed through the analog LPF 2 into a digital signal using a sampling frequency higher than a sampling frequency (first sampling frequency) finally oscillated from the over-sampling A/D converting circuit 1. The sampling frequency of the A/D converter 11 is, for example, 8 fsc. The A/D converter 11 receives a clock of 8 fsc in accordance with the color television system from the clock generation PLL 15 to execute sampling with the input frequency 8 fsc as a sampling clock. That is, the A/D converter 11 executes the sampling with the sampling frequency 8 fsc (=8 ×3.58=28.64 MHz) for the NTSC color television system and with the sampling frequency 8 fsc (=8×4.43=35.44 MHz) for the PAL color television system.

The digital LPF 12 (frequency band limiting filter unit) eliminates the signal component of the digital video signal output from the A/D converter 11 with the frequency not lower than a predetermined cut-off frequency and mainly allows the passage of the digital signal (signal within a predetermined passing band) with the frequency not higher than the cut-off frequency. The cut-off frequency of the digital LPF 12 is preferably the Nyquist frequency of the down-sampling circuit 13, for example, 2 fsc. If the cut-off frequency is set to the Nyquist frequency of the down-sampling circuit 13, the generation of the aliasing noise in the down-sampling circuit 13 can be efficiently suppressed.

Further, the digital LPF 12 of this embodiment operates with the filter characteristics of the cut-off frequency (2 fsc) in accordance with the color television system. That is, the digital LPF 12 changes the cut-off frequency based on the color television system determination signal output from the color television system determining circuit 14 as described below. For example, the digital LPF 12 operates to obtain the cut-off frequency 2 fsc (=2×3.58=7.16 MHz) for the NTSC color television system and the cut-off frequency 2 fsc (=2×4.43=8.86 MHz) for the PAL color television system. If the component signal is input, the digital LPF 12 operates to obtain the cut-off frequency of 13.5 MHz.

Further, the digital LPF 12 is designed to operate with predetermined filter characteristics based on the clock generated by the clock generation PLL 15. For example, when the clock of 8 fsc (=28.64 MHz) is input, the digital LPF 12 operates to obtain the cut-off frequency of 7.16 MHz for the NTSC color television system. When the clock of 8 fsc (=35.44 MHz) is input, the digital LPF 12 operates to obtain the cut-off frequency of 8.86 MHz.

The down-sampling circuit 13 (second sampling unit) down-samples (thins out) the digital video signal passed through the digital LPF 12 to be converted into a digital signal with the sampling frequency (second sampling frequency) equal to the sampling frequency finally oscillated from the over-sampling A/D converting circuit 1. The sampling frequency of the down-sampling circuit 13 is, for example, 4 fsc. The down-sampling circuit 13 receives the clock of 4 fsc in accordance with the color television system from the ½ divider circuit 16 to execute the sampling with the input frequency 4 fsc as a sampling clock. That is, the down-sampling circuit 13 executes the sampling with the frequency 4 fsc (=4×3.58=14.32 MHz) for the NTSC color television system and with the frequency 4 fsc (=4×4.43=17.72 MHz) for the PAL color television system.

The color television system determining circuit 14 determines a color television system based on the digital video signal output from the down-sampling circuit 13. The color television system determining circuit 14 is also a switching circuit for switching filter characteristics of the digital LPF 12, the sampling frequency of the A/D converter 11, and the sampling frequency of the down-sampling circuit 13 based on the color television system determination result. The color television system determining circuit 14 determines the color television system, for example, as the NTSC system, the PAL system, the SECAM system, or the like, or determines whether or not the signal is component signal. The determination of the color television system may be carried out on the basis of the frequency of the burst signal, a field frequency, the frequency fsc, and a phase of a horizontal line. If the frequency fsc is 3.58 MHz, for example, the color television system is the NTSC system, and if the frequency fsc is 4.43 MHz, the color television system is the PAL system. The color television system determining circuit 14 determines the color television system to send a color television system determination signal representing the determined color television system to the clock generation PLL 15 and the digital LPF 12.

The clock generation PLL 15 generates a clock of the first clock frequency based on the color television system determination signal output from the system determining circuit 14. The A/D converter 11, the digital LPF 12, and the down-sampling circuit 13 operate at this clock. For example, the clock generation PLL 15 generates the clock of 8 fsc as the sampling frequency of the A/D converter 11 in accordance with the color television system as mentioned above. The system clock used in this embodiment is, for example, a burst lock clock, and the clock generation PLL 15 generates a clock of the frequency fsc with reference to the burst signal in the video signal. The system clock may be such a horizontal synchronizing lock clock that the clock of the frequency fsc is generated with reference to the horizontal synchronizing signal in the video signal. However, it is possible to accurately generate a clock in accordance with the variations of the video signal with reference to the burst signal rather than the horizontal synchronizing signal.

The ½ divider circuit 16 generates a clock of the second clock frequency obtained by dividing the clock generated with the clock generation PLL 15. The ½ divider circuit 16 divides the clock of 8 fsc into ½ to generate the clock of 4 fsc as the sampling frequency of the down-sampling circuit 13 as described above.

Referring next to FIG. 2, the configuration of a digital LPF used in the over-sampling A/D converting circuit according to the present invention is described.

As shown in FIG. 2, the digital LPF 12 can be composed of, for example, an FIR filter, which switches a filter factor based on the color television system determination signal output from the color television system determining circuit 14. In the illustrated example, the filter factor is switched among three factors A, B, and C based on the color television system determination signal. For example, in the NTSC system, the filter factor is set to A. In the PAL system, the filter factor is set to B. In the component signal, the filter factor is set to C. Thus, the transfer function H (z) is switched to $1+A_1z^0+ \ldots + A_{n-1}z^{n-1}+A_nz^n$, $1+B_1z^0+ \ldots +B_{n-1}z^{n-1}+B_nz^n$, or $1+C_1z^0+ \ldots +C_{n-1}z^{n-1}+C_nz^n$. Hence, as the filter characteristics, a desired cut-off frequency can be obtained. The filter factor may be switched among an arbitrary number of filter factors, not among three factors.

The digital LPF 12 includes, as shown in FIG. 2, a delay element (flip flop) 200 for delaying an input signal, plural selection circuits 201 for selecting one of the filter factors A, B, and C, plural multipliers 202 for multiplying the input signal through the delay element 200 by the filter factor selected by the selection circuits 201, plural adders 203 for adding the multiplying results from the multipliers 202, plural delay elements 204 for delaying the addition result from the adders 203, an adder 205 for adding the addition result from the adders 203 to the input signal, and a delay element 206 for delaying the addition result from the adder 205 to output the delayed one.

In this embodiment, the filter factor is switched in the LPF of the A/D converting circuit depending on the color television system in this way to thereby change the filter characteristics. Thus, the cut-off frequency suitable for each color television system can be obtained. That is, the frequency band to be limited can be changed in accordance with the sampling frequency that varies depending on the color television system. Therefore, the generation of the aliasing noise can be accurately suppressed to improve the S/N ratio. As a result, the quality of an image such as a picture processed downstream from the A/D converting circuit can be improved. In particular, in the television receiver having a large screen, an influence of the weak image noise is more conspicuous in the image displayed on the screen. Hence, if applied to the television receiver, the present invention produces more beneficial effects.

Second Embodiment

Figure 3:
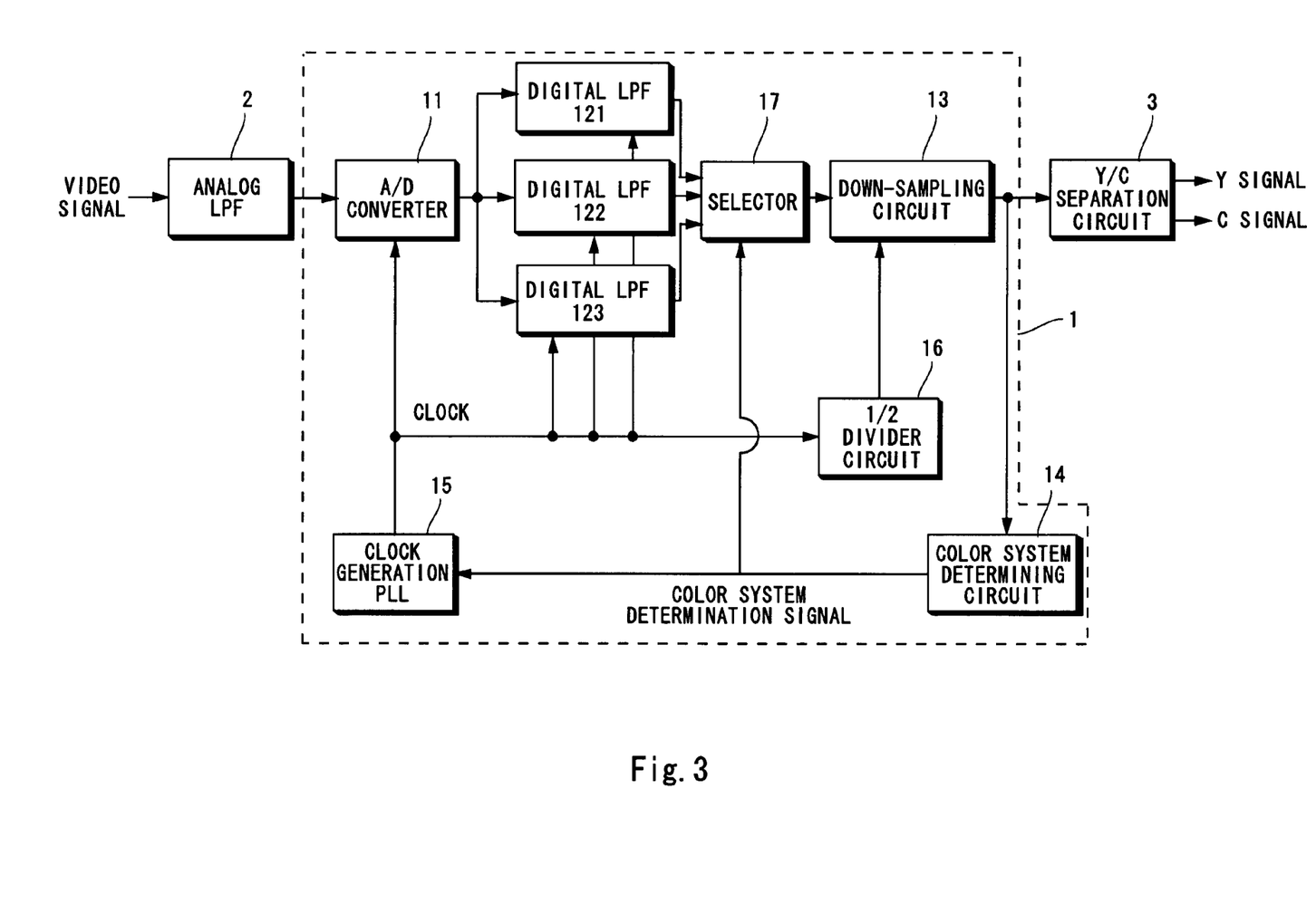
FIG. 3 is a block diagram showing the configuration of the video signal processing apparatus according to an embodiment of the present invention.

Referring next to FIG. 3, a video signal processing circuit and an A/D converting circuit according to a second embodiment of the present invention are described. A feature of this embodiment is that an LPF of the A/D converting circuit is selected in accordance with a color television system to thereby obtain the optimum filter characteristics.

FIG. 3 shows the configuration of the video signal processing circuit according to this embodiment. The same components as those of FIG. 1 are denoted by like reference numerals, and their description is omitted if not necessary.

In this embodiment, in the over-sampling A/D converting circuit 1, digital LPFs 121, 122, and 123 and a selector 17 are provided in place of the digital LPF 12 of FIG. 1.

Different cut-off frequencies are set for the digital LPFs 121, 122, and 123, each of which is optimum for a corresponding color television system. In the illustrated example, the three digital LPFs are provided, but the present invention is not limited thereto, and an arbitrary number of digital LPFs may be provided.

For example, the digital LPF 121 operates to obtain the cut-off frequency 2 fsc (=7.16 MHz) for the NTSC system. The digital LPF 122 operates to obtain the cut-off frequency 2 fsc (=8.86 MHz) for the PAL system. The digital LPF 123 operates to obtain the cut-off frequency of 13.5 MHz for the component signal.

Further, the digital LPFs 121, 122, and 123 are designed to operate based on the clock generated by the clock generation PLL 15. For example, upon receiving the clock 8 fsc (=28.64 MHz), the digital LPF 121 operates to obtain the cut-off frequency of 7.16 MHz, for example. Upon receiving the clock of 8 fsc (=35.44 MHz), for example, the digital LPF 122 operates to obtain the cut-off frequency of 8.86 MHz.

The selector 17 selects the output from one of the digital LPFs 121, 122, and 123 based on the color television system determination signal output from the color television system determining circuit 14. For example, the selector 17 selects the output from the digital LPF 121 for the NTSC color television system, the output from the digital LPF 122 for the PAL color television system, and the output from the digital LPF 123 for the component signal. It is possible to change the filter characteristics in accordance with the color television system.

The selector 17 selects the output signal from one of the digital LPFs 121 to 123. However, the present invention is not limited thereto, and the input signal of one of the digital LPFs 121 to 123 may be selected. Further, when the selector 17 selects one of the digital LPFs 121 to 123, the supply of clock or power to the remaining digital LPFs may be stopped to stop the operation. With these settings, even if the plural digital LPFs are provided, the power consumption can be saved.

As mentioned above, according to this embodiment, an appropriate LPF is selected from different LPFs in the A/D converting circuit based on the color television system to thereby change the filter characteristics. Therefore, similar to the first embodiment, it is possible to improve the S/N ratio and image quality in a subsequent stage. Further, different LPFs are provided, making it possible to simplify the circuit configuration and reduce the circuit size of each LPF as compared to that of FIG. 2.

Other Embodiments

In the above example, the filter characteristics are changed by selecting an appropriate filter factor or LPF. However, the present invention is not limited thereto, and the filter characteristics may be changed with other methods. For example, the clock frequency input to the LPF may be changed in accordance with the color television system.

In the above example, the filter characteristics of the digital LPF upstream from the down-sampling circuit are changed in accordance with the color television system, but the present invention is not limited thereto, and the characteristics of the analog LPF upstream from the A/D converter may be changed. Accordingly, the aliasing noise generated in the A/D converter can be reduced.

In the above example, the color television system is determined by the color television system determination circuit. However, the present invention is not limited thereto, and a predetermined color television system may be set in advance.

In the above example, the present invention is applied to the A/D converting circuit used for Y/C separation of the video signal but may be used for other applications. For example, the present invention is applicable to a circuit for A/D-converting a sound signal of a television signal in accordance with the color television system.

It is apparent that the present invention is not limited to the above embodiment and it may be modified and changed without departing from the scope and spirit of the invention.

What is claimed is:

1. An over-sampling A/D converting circuit, comprising:
an input receiving an analog video signal; and
a filter unit limiting a frequency band of the analog video signal in accordance with a sampling frequency that varies depending on a color television system of the analog video signal,
wherein the filter unit includes a plurality of frequency band limiting filters each having a predetermined passing band based on the sampling frequency in accordance with the color television system, the frequency band limiting filter suitable for the sampling frequency being selected from among the plurality of frequency band limiting filters.

2. The over-sampling A/D converting circuit according to claim 1, wherein unselected frequency band limiting filters out of the plurality of frequency band limiting filters stop operating.

3. An over-sampling A/D converting circuit, comprising:
a first sampling unit executing A/D conversion on an input analog video signal with a first sampling frequency;
a frequency band limiting filter unit allowing passage of a signal component in a predetermined passing band out of a signal passing through the first sampling unit;
a second sampling unit sampling the passed signal with a second sampling frequency; and
a switching unit switching the passing band of the frequency band limiting filter unit,
wherein the switching unit determines a color television system of the analog video signal based on the signal sampled with the second sampling frequency to switch the passing band of the frequency band limiting filter unit in accordance with the determined color television system.

4. The over-sampling A/D converting circuit according to claim 3, wherein the switching unit switches the first sampling frequency and the second sampling frequency.

5. The over-sampling A/D converting circuit according to claim 3, wherein the switching unit switches the passing band of the frequency band limiting filter unit in accordance with the second sampling frequency.

6. The over-sampling A/D converting circuit according to claim 3, wherein the first sampling frequency is higher than the second sampling frequency.

7. The over-sampling A/D converting circuit according to claim 3, wherein the frequency band limiting filter unit is a low-pass filter that allows passage of a signal component in a frequency range not higher than a cut-off frequency.

8. The over-sampling A/D converting circuit according to claim 7, wherein the cut-off frequency is a Nyquist frequency of the second sampling frequency.

9. The over-sampling A/D converting circuit according to claim 3, wherein the frequency band limiting filter unit includes a selection unit selecting a filter factor in accordance with the switching of the switching unit.

10. The over-sampling AID converting circuit according to claim 3, wherein the frequency band limiting filter unit includes: a plurality of filters having different passing bands; and a selection unit selecting one of the plurality of filters in accordance with the switching of the switching unit.

11. The over-sampling A/D converting circuit according to claim 10, wherein the selection unit stops an operation of unselected filters out of the plurality of filters.

12. The over-sampling A/D converting circuit according to claim 3, further comprising:
a first clock generating circuit generating a clock of a first clock frequency in accordance with the switching of the switching unit to apply the clock of the first clock frequency to the first sampling unit and the frequency band limiting filter unit; and
a second clock generating circuit applying a clock of a second clock frequency obtained by dividing the clock of the first clock frequency to the second sampling unit.

13. The over-sampling A/D converting circuit according to claim 12, wherein the first clock frequency is the first sampling frequency, and the second clock frequency is the second sampling frequency.

14. A method of sampling an analog video signal, comprising:
receiving the analog video signal; and
limiting a frequency band of the analog video signal in accordance with a sampling frequency that varies depending on a color television system of the analog video signal,
wherein the limiting step comprises:
passing the analog video signal through a filter unit that includes a plurality of frequency band limiting filters each having a predetermined passing band based on the sampling frequency in accordance with the color television system; and
selecting a frequency band limiting filter suitable for the sampling frequency from among the plurality of frequency band limiting filters.

* * * * *